United States Patent
Chang et al.

(10) Patent No.: US 8,515,489 B2
(45) Date of Patent: Aug. 20, 2013

(54) METHODS FOR SCHEDULING RADIO ACTIVITIES FOR MULTIPLE RADIO ACCESS TECHNOLOGIE MODULES IN A COMMUNICATIONS APPARATUS AND COMMUNICATIONS APPARATUSES UTILIZING THE SAME

(75) Inventors: Yi-Ting Chang, Zhubei (TW);
Chih-Yung Shih, Taichung (TW);
Chen-Wei Hsu, Taichung (TW);
Chia-Yi Huang, Taichung (TW);
Chung-Cheng Yu, Kaohsiung (TW)

(73) Assignee: MediaTek Inc., Hsin-Chu (TW)

( * ) Notice: Subject to any disclaimer, the term of this patent is extended or adjusted under 35 U.S.C. 154(b) by 193 days.

(21) Appl. No.: 13/220,026

(22) Filed: Aug. 29, 2011

(65) Prior Publication Data

US 2013/0053076 A1    Feb. 28, 2013

(51) Int. Cl.
*H04M 1/00*    (2006.01)

(52) U.S. Cl.
USPC .................. 455/552.1; 455/553.1; 455/127.4; 455/426.1

(58) Field of Classification Search
USPC ................ 455/127.4, 426.1, 432.1, 434–444, 455/525, 552.1, 553.1, 160.1; 370/331–334
See application file for complete search history.

(56) References Cited

U.S. PATENT DOCUMENTS

| | | | |
|---|---|---|---|
| 7,054,290 B1 | 5/2006 | Djuphammar | |
| 7,333,825 B2 | 2/2008 | Hamiti et al. | |
| 8,036,664 B2 * | 10/2011 | Khetawat et al. | 455/436 |
| 2002/0072376 A1 | 6/2002 | Carlsson et al. | |
| 2005/0048984 A1 | 3/2005 | Foster et al. | |
| 2006/0111134 A1 | 5/2006 | Mills | |
| 2007/0004409 A1 | 1/2007 | Sako et al. | |
| 2007/0264992 A1 * | 11/2007 | Maenpaa | 455/420 |
| 2009/0042601 A1 * | 2/2009 | Wang et al. | 455/553.1 |
| 2009/0068969 A1 * | 3/2009 | Lindoff et al. | 455/161.1 |
| 2009/0180451 A1 | 7/2009 | Alpert et al. | |
| 2010/0034126 A1 * | 2/2010 | Kitazoe et al. | 370/310 |
| 2010/0113010 A1 * | 5/2010 | Tenny et al. | 455/423 |
| 2011/0058480 A1 * | 3/2011 | Dahlen | 370/237 |
| 2011/0195714 A1 * | 8/2011 | Sawinathan | 455/435.1 |
| 2011/0205984 A1 | 8/2011 | Lee et al. | |
| 2011/0217969 A1 | 9/2011 | Spartz et al. | |
| 2012/0231793 A1 * | 9/2012 | Wu | 455/436 |
| 2012/0252487 A1 * | 10/2012 | Siomina et al. | 455/456.1 |
| 2012/0300657 A1 * | 11/2012 | Jung et al. | 370/252 |
| 2012/0302241 A1 * | 11/2012 | Klingenbrunn et al. | 455/436 |

FOREIGN PATENT DOCUMENTS

| | | |
|---|---|---|
| DE | 102010061020 | 8/2011 |
| WO | WO 2011/109750 | 9/2011 |

* cited by examiner

*Primary Examiner* — Dominic E Rego
(74) *Attorney, Agent, or Firm* — McClure, Qualey & Rodack, LLP (57) ABSTRACT

A communications apparatus with a processor coupled to a first RAT module in a packet transfer mode for data transfer, a second RAT module in an idle mode and a radio transceiver are provided. The processor receives a reservation request requesting permission to use the radio transceiver for performing a first radio activity from the first RAT module, and determines whether to provide a gap interval during the data transfer of the second RAT module for the first RAT module to use the radio transceiver according to a type of a second radio activity to be preformed by the second RAT module which collides with the first radio activity. When the gap interval is determined to be provided, the second RAT module is unable to use the radio transceiver for performing the second radio activity and the data transfer of the second RAT module is suspended during the gap interval.

18 Claims, 9 Drawing Sheets

METHODS FOR SCHEDULING RADIO ACTIVITIES FOR MULTIPLE RADIO ACCESS TECHNOLOGIE MODULES IN A COMMUNICATIONS APPARATUS AND COMMUNICATIONS APPARATUSES UTILIZING THE SAME

BACKGROUND OF THE INVENTION

1. Field of the Invention

The invention relates to a method for scheduling radio activities for multiple radio access technology (RAT) modules in a communications apparatus, and more particularly to a method for scheduling radio activities for multiple RAT modules sharing one antenna in a communications apparatus.

2. Description of the Related Art

The term "wireless", normally refers to an electrical or electronic operation, which is accomplished without the use of a "hard wired" connection. "Wireless communications", is the transfer of information over a distance without the use of electrical conductors or wires. The distances involved may be short (a few meters for television remote controls) or very long (thousands or even millions of kilometers for radio communications). The best known example of wireless communications is the cellular telephone. Cellular telephones use radio waves to enable an operator to make phone calls to another party, from many locations world-wide. They can be used anywhere, as long as there is a cellular telephone site to house equipment that can transmit and receive signals, which are processed to transfer both voice and data to and from the cellular telephones.

There are various well-developed and well-defined cellular communications technologies. For example, the Global System for Mobile communications (GSM) is a well-defined and commonly adopted communications system, which uses time division multiple access (TDMA) technology, which is a multiplex access scheme for digital radio, to send voice, data, and signaling data (such as a dialed telephone number) between mobile phones and cell sites. The CDMA2000 is a hybrid mobile communications 2.5G/3G (generation) technology standard that uses code division multiple access (CDMA) technology. The UMTS (Universal Mobile Telecommunications System) is a 3G mobile communications system, which provides an enhanced range of multimedia services over the GSM system. The Wireless Fidelity (Wi-Fi) is a technology defined by the 802.11 engineering standard and can be used for home networks, mobile phones, video games, to provide a high-frequency wireless local area network.

BRIEF SUMMARY OF THE INVENTION

Communications apparatuses and methods for scheduling radio activities for at least a first radio access technology (RAT) module and a second RAT module configured in a communications apparatus and sharing a radio transceiver are provided. An embodiment of a communications apparatus comprises a processor coupled to a first RAT module, a second RAT module and a radio transceiver. The first RAT module camps on a first cell belonging to a first wireless network and is in an idle mode. The second RAT module camps on a second cell belonging to a second wireless network and is in a packet transfer mode to construct a connection with the second wireless network and perform data transfer in the second wireless network via the radio transceiver. The processor receives a reservation request, requesting permission to use the radio transceiver for performing a first radio activity in the idle mode, from the first RAT module, and determines whether to provide a gap interval during the data transfer of the second RAT module for the first RAT module to use the radio transceiver for performing the first radio activity according to a type of a second radio activity that is going to be preformed by the second RAT module during the data transfer which collides with the first radio activity, and when the gap interval is determined to be provided for the first RAT module, the second RAT module is unable to use the radio transceiver for performing the second radio activity and the data transfer of the second RAT module is suspended during the gap interval.

Another embodiment of a method for scheduling radio activities for at least a first radio access technology (RAT) module and a second RAT module configured in a communications apparatus and sharing a radio transceiver are provided, wherein the first RAT module camps on a first cell belonging to a first wireless network and is in an idle mode and the second RAT module camps on a second cell belonging to a second wireless network and is in a packet transfer mode to construct a connection with the second wireless network and perform data transfer in the second wireless network via the radio transceiver. The method comprises: maintaining a list comprising a plurality of records of registered radio activities registered by the first and second RAT modules, wherein each record comprises information regarding a start time of a registered radio activity and a RAT module for performing the registered radio activity; receiving a reservation request for requesting permission to use the radio transceiver for performing a first registered radio activity from one of the first and second RAT modules, wherein the reservation request comprises information regarding a time interval for performing the first registered radio activity; determining whether to grant the RAT module transmitting the reservation request use of the radio transceiver for performing the first registered radio activity by checking whether there is any registered radio activity registered by another one of the first and second RAT modules which is recorded in the list and has a start time that falls within the time interval for performing the first registered radio activity; and granting the RAT module transmitting the reservation request the use of the radio transceiver for performing the first registered radio activity when there is a second registered radio activity registered by another one of the first and second RAT modules which is recorded in the list and has a start time that falls within the time interval for performing the first registered radio activity and the second registered radio activity has a priority lower than that of the first registered radio activity.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

With advancements in communications techniques, mobile stations (MS, which may be interchangeably referred to as user equipments (UE)) are now capable of handling different radio access technologies (RAT), such as at least two of GSM/GPRS/EDGE (Global System for Mobile Communications/General Packet Radio Service/Enhanced Data rates for Global Evolution), WCDMA (Wideband Code Division Multiple Access), cdma2000, WiMAX (Worldwide Interoperability for Microwave Access), TD-SCDMA (Time Division Synchronous Code Division Multiple Access), LTE (Long Term Evolution), and TD-LTE (Time Division Long Term Evolution) RATs, or the similar via one communications apparatus.

Figure 1:
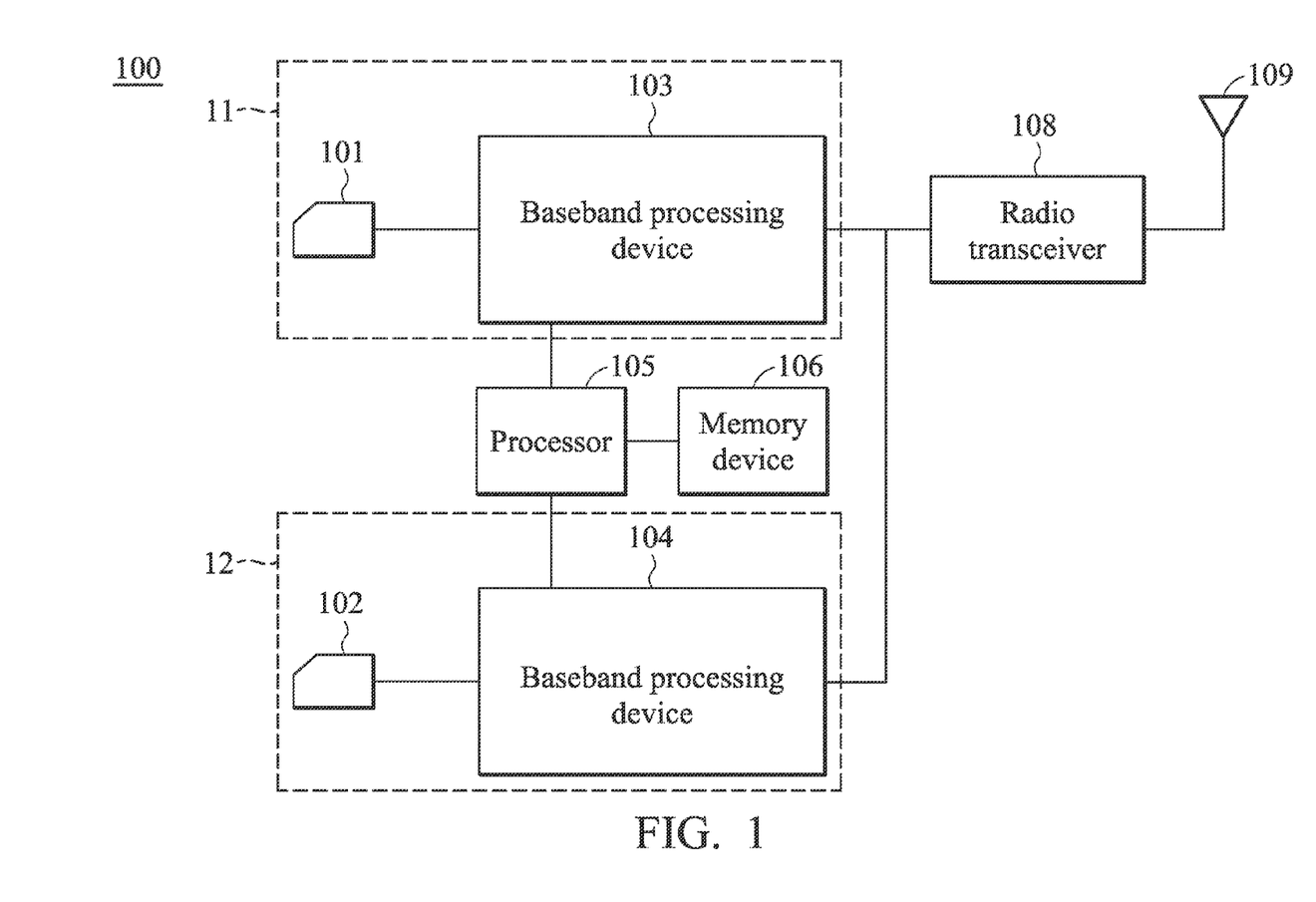
FIG. 1 shows a communications apparatus equipped with two different RAT modules according to an embodiment of the invention.

FIG. 1 shows a communications apparatus equipped with two RAT modules according to an embodiment of the invention. The communications apparatus 100 may comprise two RAT modules 11 and 12 (which may be different RATs or the same RAT, and the invention should not be limited to either cases), a processor 150 coupled to the RAT modules 11 and 12, a memory device 106, and a radio transceiver 108 and an antenna 109 shared by the RAT modules 11 and 12. The RAT module 11 may at least comprise a subscriber identity card 101 and a baseband processing device 103, and the RAT module 12 may at least comprise a subscriber identity card 102 and a baseband processing device 104.

The radio transceiver 108 may receive wireless radio frequency signals, convert the received signals to baseband signals to be processed by the baseband processing device 103 and/or 104, or receive baseband signals from the baseband processing device 103 and/or 104 and convert the received signals to wireless radio frequency signals to be transmitted to a peer device. The radio transceiver 108 may comprise a plurality of hardware devices to perform radio frequency conversion. For example, the radio transceiver 108 may comprise a mixer to multiply the baseband signals with a carrier oscillated in the radio frequency of the wireless communication system, wherein the radio frequency may be, for example, 900 MHz or 1800 MHz for a global system for mobile communication (GSM), or 1900 MHz for a Universal Mobile Telecommunications System (UMTS), or others. The baseband processing devices 103 and 104 may further convert the baseband signals to a plurality of digital signals, and process the digital signals, and vice versa. The baseband processing devices 103 and 104 may also comprise a plurality of hardware devices to perform baseband signal processing. The baseband signal processing may comprise analog to digital conversion (ADC)/digital to analog conversion (DAC), gain adjustments, modulation/demodulation, encoding/decoding, and so on. The processor 105 may control the operations of the baseband processing devices 103 and 104, the radio transceiver 108, and the subscriber identity cards 101 and 102 plugged into two sockets, respectively. The processor 105 may read data from the plugged in subscriber identity cards 101 and 102 and write data to the plugged in subscriber identity cards 101 and 102.

According to an embodiment of the invention, the processor 105 may be arranged to execute the program codes of the corresponding software module of the RAT modules 11 and 12. The processor 105 may maintain and execute the individual tasks, threads, and/or protocol stacks for the RAT modules 11 and 12, so as to independently control the operations of the baseband processing devices 103 and 104, the radio transceiver 108, and the subscriber identity cards 101 and 102 plugged into two sockets, respectively. In the preferred embodiments, two protocol stacks may be implemented so as to respectively handle the radio activities of the individual RAT module. However, it is also possible to implement only one protocol stack to handle the radio activities of the RAT module at the same time, and the invention should not be limited thereto. Note also that in other embodiments of the invention, the communications apparatus may also be designed to have dual processors. As the communications apparatus 100' shows in FIG. 2, the processors and memory devices may be integrated in Baseband processing devices 103' and 104' of the RAT modules 11' and 12', respectively, and each processor may maintain and execute the task(s), thread(s), and/or protocol stack(s) for the corresponding RAT module 11' or 12'. Therefore, the invention should not be limited to either case.

Figure 2:
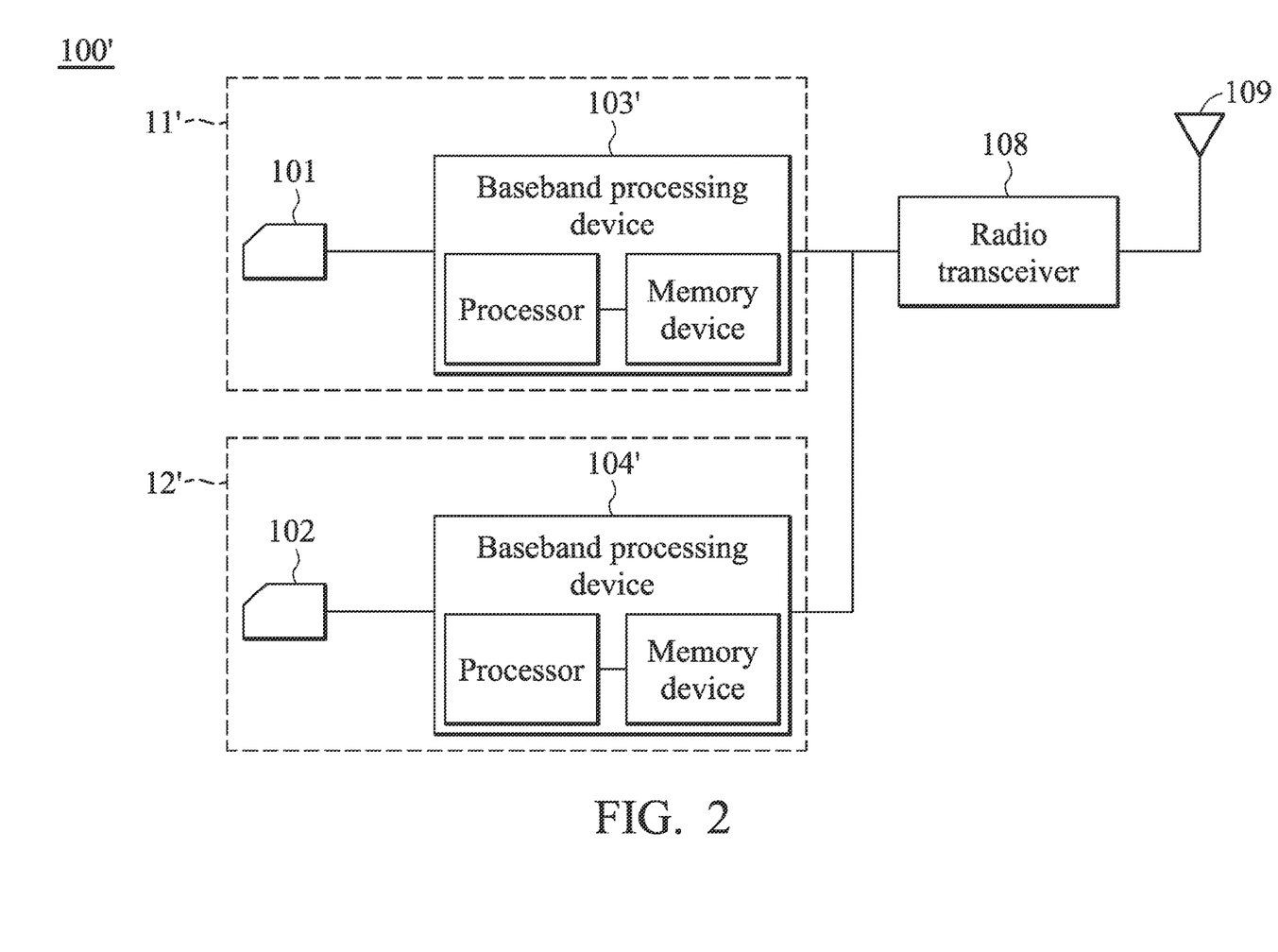
FIG. 2 shows a communications apparatus equipped with two different RAT modules according to another embodiment of the invention.
Figure 3:
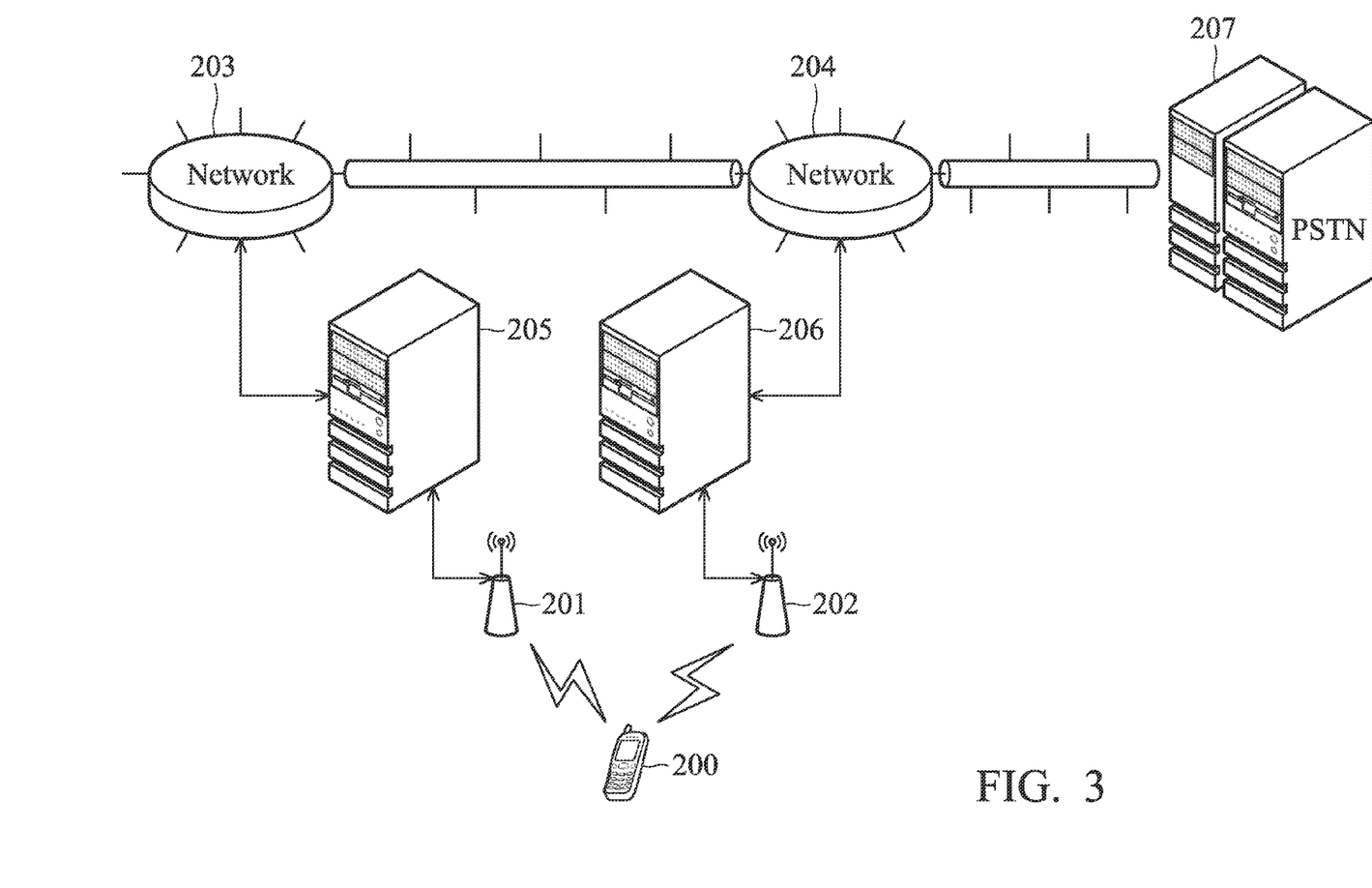
FIG. 3 shows an exemplary network topology according to an embodiment of the invention.

FIG. 3 shows an exemplary network topology according to an embodiment of the invention. The communications apparatus 200 shown in FIG. 3 may be the communications apparatuses 100 and 100' previously described in FIG. 1 and FIG. 2. Thus, from hereinafter, the communications apparatus 200 will be used to represent all like previously described apparatuses for brevity. The communications apparatus 200, equipped with more than one subscriber identity card, may simultaneously access more than one network 203 and 204 of the same or different RATs, where the network 203 or 204 may be the GSM, WCDMA, Wi-Fi, CDMA2000 or Time Division-Synchronous Code Division Multiple Access (TD-SCDMA) network, or Internet, or the like, after camping on or associating with the cells managed by the access stations 201 and 202, where the access station 201 or 202 may be a base station, a node-B, or an access point compatible with 802.1a, 802.1b or 802.1g. The communications apparatus 200 may issue an apparatus originated communication request, such as a voice call, a data call, a video call, or a voice over Internet Protocol (VOIP) call, to a called party (i.e. the corresponding peer of another wired or wireless communication apparatus) through at least one of the networks 203 and 204 with corresponding intermediary apparatuses 205 and 206 (for example, the GSM network with a Mobile Switching Center (MSC), the WCDMA/TD-SCDMA network with a Radio Network Controller (RNC), or the Internet with a Session Initiation Protocol (SIP) server), or through the Public Switched Telephone Network (PSTN) 207 or any combinations thereof, by using any of the equipped subscriber identity cards. Moreover, the communications apparatus 200 may receive an apparatus terminated communication request, also referred to as mobile terminated (MT) call request, such as an incoming phone call, with any of the subscriber identity cards from a calling party. It is to be understood that there may be one or more gateways positioned between heterogeneous types of networks.

According to an embodiment of the invention, because the radio resources (for example, including at least the radio transceiver 108 and antenna 109) are shared by the RAT modules 11 and 12 (or the RAT modules 11' and 12' as show in FIG. 2), an arbiter is introduced to schedule and coordinate radio activities of different RAT modules. The radio activity may be, for example but not limited to, a channel activity for transmitting or receiving information to or from the corresponding cell, or a measurement activity for performing a power scan or frequency scan of a serving cell or neighbor cell, or others. In some embodiments of the invention, a real time base (RTB) software module may be designed to play a role for scheduling and coordinating the radio activities. When the RTB software module is executed by the processor 105 as shown in FIG. 1 or by the processors as shown in FIG. 2, it may become an apparatus, such as an arbiter to schedule and coordinate the radio activities of different RAT modules. Note that in other embodiments, the arbiter may also be designed and implemented as a dedicated hardware device, and the invention should not be limited thereto. In addition, no matter if the arbiter is implemented by a dedicated hardware device or by the RTB software module executed by the processor, the term "arbiter" is used as a subject term in the following paragraphs to clearly describe the operations thereof.

According to an embodiment of the invention, the arbiter may receive registration requests for registering forthcoming radio activities in advanced from the RAT modules, receive reservation requests for requesting permission to use the radio resources for performing the registered radio activities from the RAT modules, schedule the radio resources for the registered radio activities, and arbitrate (or determine) which RAT module is allowed to use the radio resources when at least one registered radio activity collides with another registered radio activity. After arbitration (or determination), the arbiter may further store information regarding the radio resources are reserved by which RAT module during which time interval in the memory device (such as the memory device 106 as shown in FIG. 1 or the memory device as shown in FIG. 2) according to the arbitration (or determination) results. Operations of the arbiter and methods for scheduling radio activities for different RAT modules will be introduced in more detail in the following paragraphs.

Figure 4:
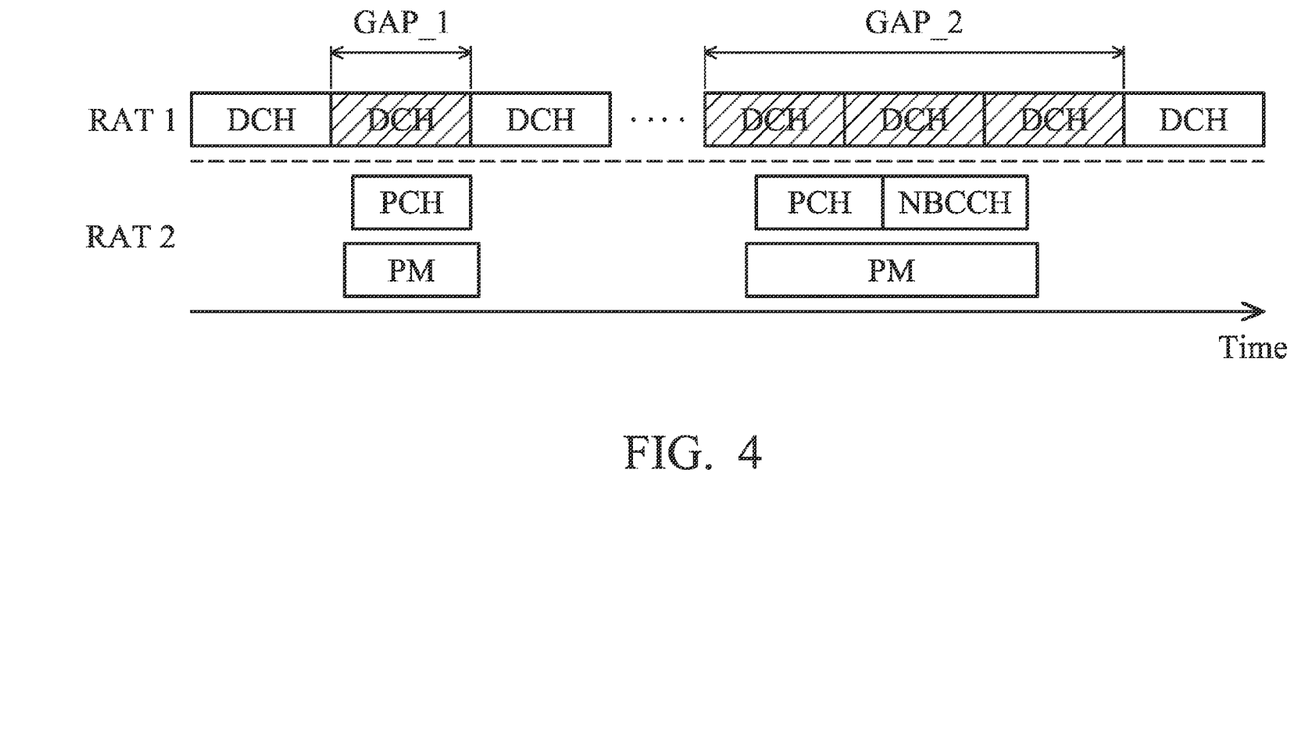
FIG. 4 is a timing diagram showing the radio activities to be performed by different RAT modules according to an embodiment of the invention.

FIG. 4 is a timing diagram showing the radio activities to be performed by different RAT modules according to an embodiment of the invention. As shown in FIG. 4, one RAT module (hereinafter called the RAT 1) configured in the communications apparatus 200 camps on a first cell belonging to a first wireless network (i.e. the service network) and enters a packet transfer mode (PTM) to construct a packet switch (PS) connection with the first wireless network and perform data transfer in the first wireless network via the radio transceiver 108 and the antenna 109. Therefore, the radio activities performed by the RAT 1 is to construct the dedicated channel (such as the plurality of DCHs along the time axis as shown) for transmitting or receiving data and/or control signals to or from the first wireless network. Meanwhile, another RAT module (hereinafter called the RAT 2) configured in the communications apparatus 200 camps on a second cell belonging to a second wireless network and enters an idle mode for normal standby. Note that in the conventional design, for the case when a communications apparatus is equipped with two RAT modules, one RAT module may enter a "flight mode" to suspend its transmitting and receiving functions when the radio resources are occupied by another RAT module to perform CS voice or PS data transfer.

However, based on the concept of the invention, in order to provide more efficient and reliable radio services, one or more gap intervals may be provided during the data transfer of the RAT module RAT1 for the RAT module RAT 2 to perform the corresponding radio activities. Therefore, in the embodiments of the invention, even if the RAT module RAT 1 enters the PTM for data transfer, the RAT module RAT 2 may still stay in the idle mode (or called a "virtual idle mode" to distinguish from the idle mode in the conventional one RAT in a communications apparatus's design). As shown in FIG. 4, the gap interval GAP_1 and GAP_2 may be provided during the data transfer of the RAT module RAT 1 for the RAT module RAT 2 to listen to the paging channel (the PCH as shown) or a neighboring cell broadcast control channel (the NBCCH as shown), or perform power measurement (the PM as shown). During the gap intervals, the data transfer is suspended, and the RAT module RAT 1 is unable to use the radio resources for performing the corresponding radio activities (therefore, the DCHs during the gap intervals are filled with slashes as shown).

Figure 5:
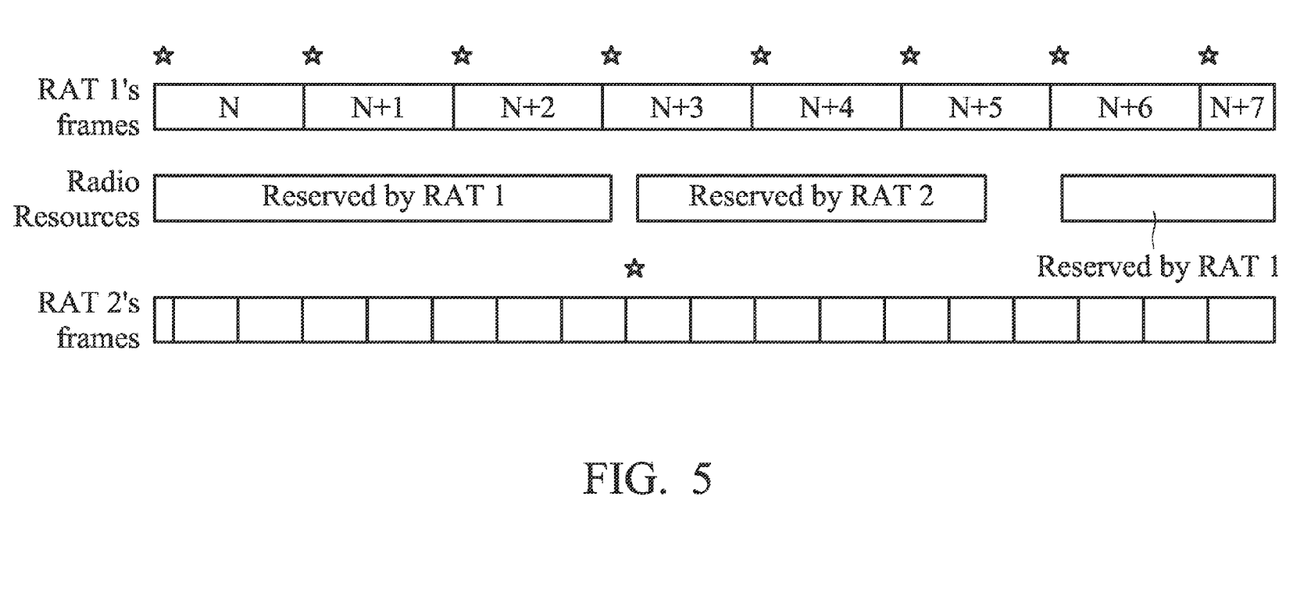
FIG. 5 is another timing diagram showing the frame timing of different RAT modules and the radio resource reservation results according to an embodiment of the invention.

FIG. 5 is another timing diagram showing the timing of frames of the different RAT modules and the radio resource reservation results according to an embodiment of the invention. According to an embodiment of the invention, the RAT module (either RAT 1 or RAT 2) may first transmit a registration request to the arbiter for registering a forthcoming radio activity that the RAT module plans to perform. The registration request may carry information regarding a start time for performing the forthcoming radio activity. Note that because the RAT modules may use different timing bases to maintain their protocol stacks, the start time information received from the different RAT modules may be further converted by the arbiter onto a common timing base.

The arbiter may maintain a list comprising a plurality of records of registered radio activities requested by the RAT modules. According to an embodiment of the invention, each record may at least comprise information regarding a start time (represented by the common timing base as previously described) of a registered radio activity and a RAT module for performing the registered radio activity. The arbiter may register the radio activity as a registered radio activity in response to the registration request, and record the information regarding the start time and the RAT module for performing the registered radio activity in the list. After registering the radio activities, the RAT module may further transmit a reservation request to the arbiter for requesting the permission to use the radio resources for performing the registered radio activity when the registered radio activity is about to be performed.

According to an embodiment of the invention, one or more timers may be set by the RAT modules when transmitting a registration request to the arbiter. When a timer expires (such as the star signs shown in FIG. 5), the RAT modules may be triggered to transmit a reservation request to the arbiter for requesting the permission to use the radio resources for performing the registered radio activity. Take the RAT 1's frames shown in FIG. 5 as an example, when the timer expires in frame N (where the timer is set by RAT 1 previously before the frame N), the RAT module RAT 1 may transmit a reservation request to the arbiter for requesting the permission to use the radio resources for performing the registered radio activity in frame (N+1). According to an embodiment of the invention, the reservation request may carry information regarding a time interval for performing the corresponding radio activity. After transmitting the reservation request, the RAT module RAT 1 may further set another timer and transmit another registration request to the arbiter when needed. For example, when there is a radio activity that has to be performed in frame (N+k), the RAT module RAT 1 may register the radio activity for frame (N+k) and set another timer to be expired before frame (N+k) for triggering the RAT module RAT 1 to transmit a reservation request to the arbiter for requesting the permission to use the radio resources for performing the registered radio activity in frame (N+k) as previously described. Note that N and k in this example are positive integers.

As to the arbiter, after receiving the reservation request, the arbiter may determine whether to grant the RAT module RAT 1 to use the radio resources for performing the registered radio activity in frame (N+1) by checking whether there is any registered radio activity registered by another RAT module (i.e. the RAT module RAT 2 in this example) which is recorded in the list and has a start time that falls within the time interval (for example, the frame interval of frame (N+1)) for performing the registered radio activity. In this example, because there is no other registered radio activity registered by the RAT module RAT 2, the RAT module RAT 1 is granted use of the radio resources for performing the registered radio activity in frame (N+1). Therefore, during the frame interval of frame (N+1), the radio resources are reserved by the RAT module RAT 1 as shown. Note that as previously described, the arbiter may store information regarding the radio resources are reserved by which RAT module during which time interval in the memory device according to the time interval information carried in the reservation request and the arbitration (determination) results.

Take the RAT 1's frames shown in FIG. 5 as another example, when the timer expires in frame (N+2), the RAT module RAT 1 may be triggered to transmit a reservation request to the arbiter for requesting the permission to use the radio resources for performing the registered radio activity in frame (N+3), and may further set another timer and transmit another registration request to the arbiter when needed. In this example, because there is another registered radio activity registered by the RAT module RAT 2, which has a higher priority than the radio activity registered by the RAT module RAT 1, the RAT module RAT 2 is granted use of the radio resources for performing the registered radio activity in frame (N+3). Therefore, during the frame interval of frame (N+3), a gap interval is generated and provided to the RAT module RAT 2, and during the gap interval, the radio resources are reserved by the RAT module RAT 2 as shown. Note that during the gap interval, the data transfer of the RAT module RAT 1 is suspended, and a length of the gap interval may be set according to the time interval for performing the radio activity of the RAT module RAT 2.

According to an embodiment, there are several ways to determine the priority of the radio activities for different RAT modules. For example, the radio activities that have to be preformed by the RAT module in the packet transfer mode for data transfer may be grouped into two types, comprising a normal data transfer type and a special procedure type. To be more specific, for example, when the radio activity is to setup a radio resource control (RRC) connection, to perform a dedicated channel synchronization procedure, to receive important system information block (SIB) or system frame number (SFN) from the corresponding wireless network, or others, the radio activities may be grouped into the special procedure type. Note that the type information may further be carried by the RAT module in the packet transfer mode in the registration request, and may also be recorded in the corresponding registration records in the list by the arbiter.

Because the radio activities of the special procedure type are preferably not to be abandoned, the priority of the radio activities of the special procedure type may be set to high, while the radio activities of the normal data transfer type may be set to low. In addition, the radio activities to be preformed by the RAT module in the idle mode may be set to medium. Therefore, in the embodiments of the invention, when the radio activity to be preformed by the RAT module in the idle mode collides with the normal data transfer type of radio activity to be preformed by the RAT module in the packet transfer mode, the normal data transfer type of radio activity may be abandoned and the gap interval may be provided for RAT module in the idle mode to perform the corresponding radio activity (or activities).

Note that because the radio resources are shared between different RAT modules, which may have different radio resources configurations, in some embodiments of the invention, the reservation request for a registered radio activity is preferably to be transmitted (or the corresponding timer is preferably to set to be expired) one frame ahead of the start time for performing the registered radio activity, so as to configure the radio resources in advanced. Therefore, in the embodiments of the invention, after obtaining the permission to use the radio resources, the radio resource driver of the corresponding RAT module may begin to configure the radio resources in advanced. Note also that, in other embodiments of the invention, the reservation request may also be transmitted (or the corresponding timer may be set to be expired) more than one frame ahead of the start time for performing the registered radio activity, so as to configure the radio resources in further advance, and the invention should not be limited thereto. In yet other embodiments of the invention, if the radio resource driver is capable of configuring the radio resources on time, the reservation request may also be transmitted (or the corresponding timer may be set to be expired) right before the start time for performing the registered radio activity, and the invention should not be limited thereto.

Figure 6:
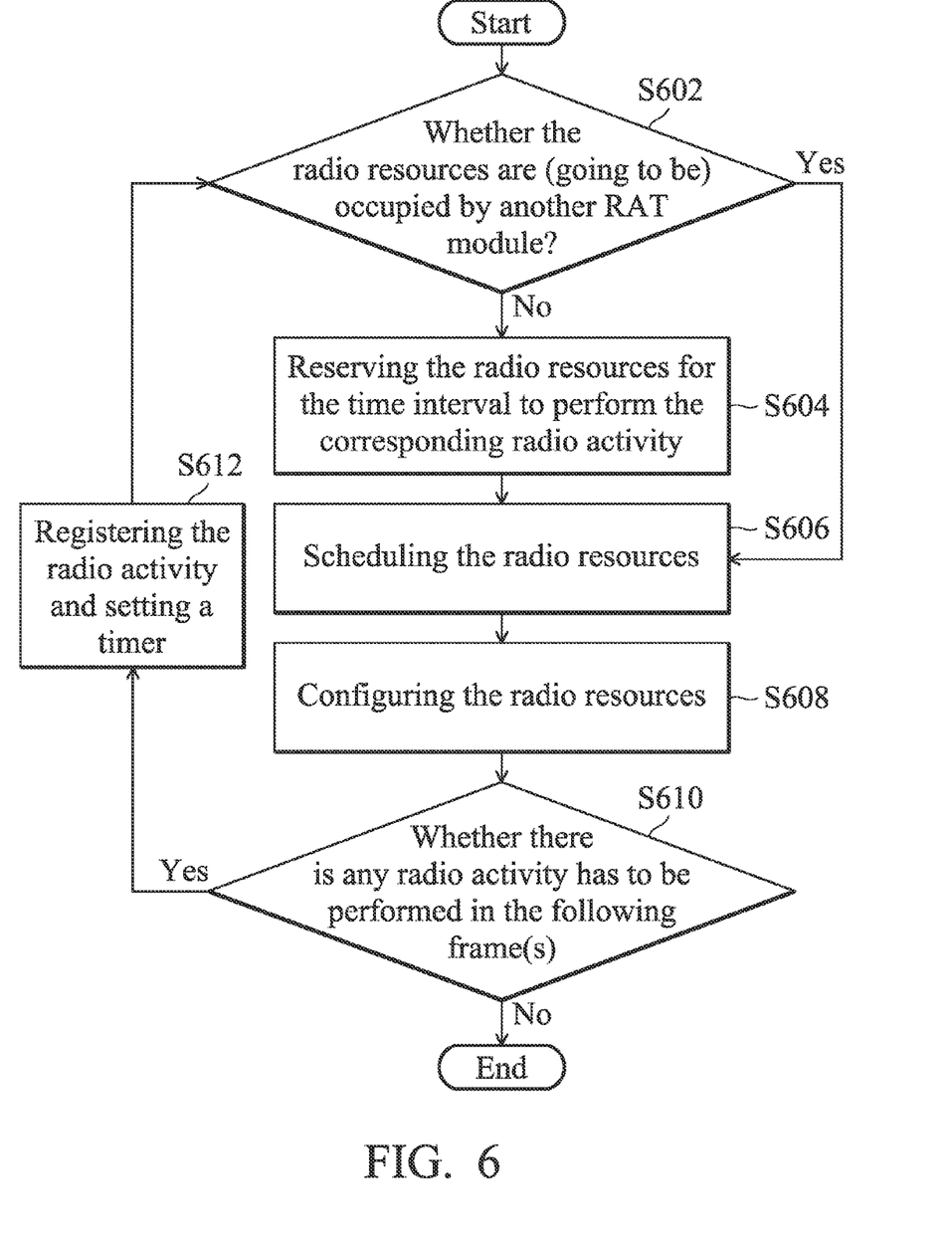
FIG. 6 is a flow chart showing a method for the RAT module to reserve and control the radio resources according to an embodiment of the invention.

FIG. 6 is a flow chart showing a method for the RAT module to reserve and control the radio resources according to an embodiment of the invention. When there is a forthcoming radio activity that has to be performed, the RAT module may first check whether the radio resources are (or, are going to be) occupied by another RAT module (Step S602). In one embodiment of the invention, the RAT module may be triggered to check the radio resources when a preset timer is expired, and check the radio resources by sending a reservation request for requesting permission to use the radio resources to the arbiter as previously described. The arbiter may determine whether the reservation request is granted according to the list maintained thereby and the priorities of the radio activities as previously described.

For the case when the start time of the radio activity to be performed by the RAT module falls into a predetermined time interval that has already been reserved by another RAT module for using the radio resources, the radio resources are determined as being occupied by another RAT module. For the case when the start time of the radio activity to be performed by the RAT module falls into a predetermined time interval requested to be reserved by another RAT module for using the radio resources to perform another radio activity having a higher priority, the radio resources are determined to be occupied by another RAT module.

When the radio resources are not (or, are not going to be) occupied by another RAT module, the RAT module may reserve the radio resources for the time interval to perform the corresponding radio activity (Step S604). As previously described, the reservation results may be recorded by the arbiter. After reserving the radio resources, or when the radio resources are (or, are going to be) occupied by another RAT module, the RAT module may schedule the radio resources (Step S606). In one embodiment, the RAT module may generate a bitmap to instruct the drivers in which frame(s) or time interval should the radio resources be turned on or off. Next, the drivers of the RAT module may start to configure the radio resources according to the scheduled results (for example, the bitmap) (Step S608). The RAT module may further check whether there is any radio activity which has to be performed in the following frame(s) (Step S610). If so, the RAT module may register the radio activity at the arbiter and set a timer for checking the radio resources for the radio activity (Step S612). If not, the procedure may be ended.

Note that in some embodiments of the invention, when the radio resources are (or, are going to be) partially occupied by another RAT module during the time interval requested to be reserved by the RAT module to perform the corresponding radio activity, the arbiter may still reserve the remaining time that the radio resources are not (or, are not going to be) occupied by another RAT module for the RAT module. For example, when the RAT module plans to reserve the radio resources from frame N to frame (N+3), but the radio resources are (or, are going to be) occupied by another RAT module from the frame N to frame (N+1), the arbiter may still reserve the radio resources for the RAT module from frame (N+2) to frame (N+3). Therefore, the RAT module may still use the remaining time to perform (a portion of) the corresponding radio activity(ies).

Figure 7:
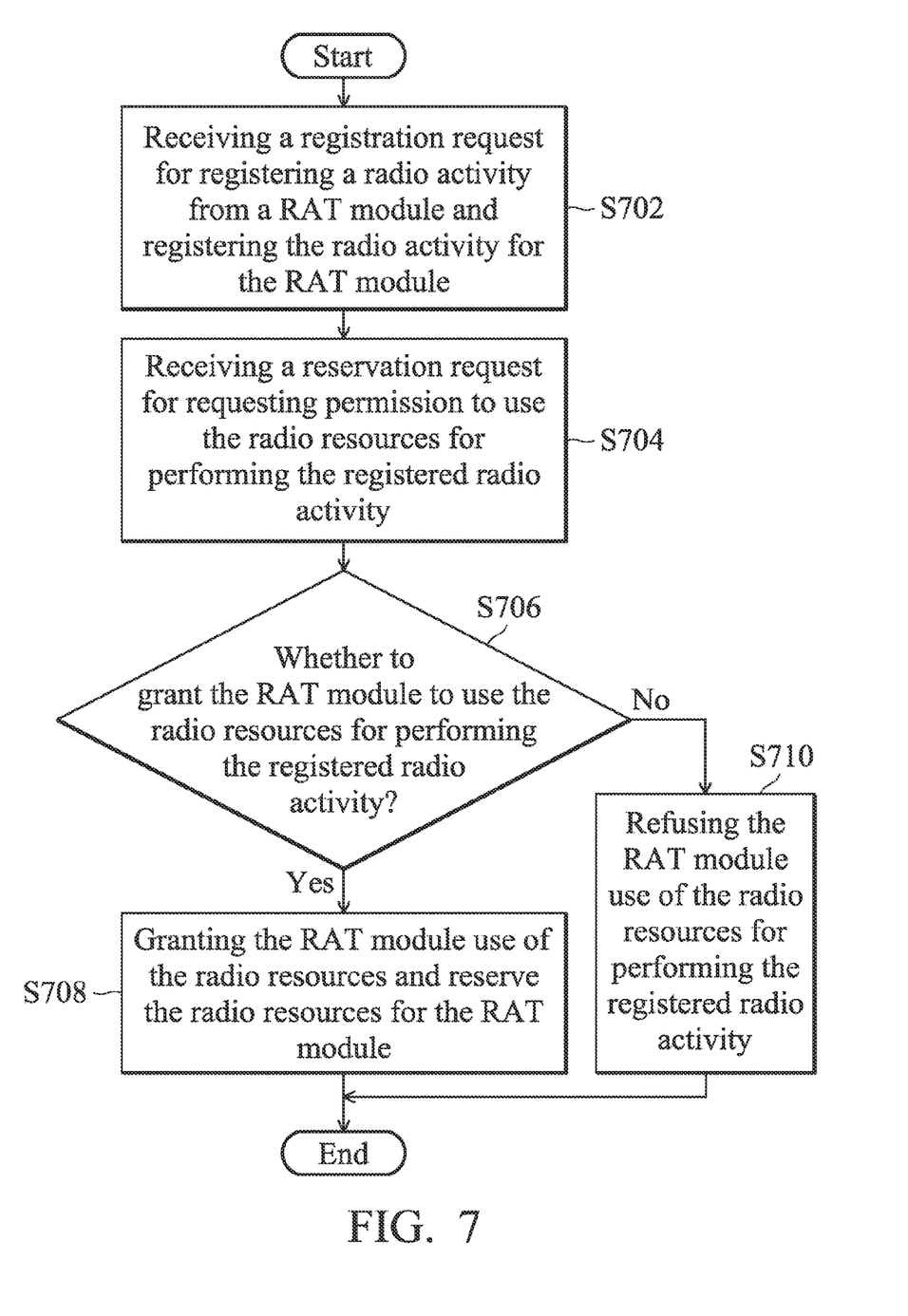
FIG. 7 is a flow chart showing a method for the arbiter to schedule the radio resources according to an embodiment of the invention.

FIG. 7 is a flow chart showing a method for the arbiter to schedule the radio resources according to an embodiment of the invention. The arbiter may first receive a registration request for registering a radio activity from a RAT module planning to perform the radio activity and register the radio activity for the RAT module (Step S702). According to the embodiment of the invention, the registration request may carry information regarding a start time for performing the radio activity, or may further carry information regarding a type of the radio activity. The radio activity may be registered in the list maintained by the arbiter, wherein each record in the list may comprise information regarding the start time of the registered radio activity and a RAT module for performing the registered radio activity. In some embodiments, each record may further comprise a type of the registered radio activity.

Next, the arbiter may receive a reservation request for requesting permission to use the radio resources for performing the registered radio activity from the RAT module (Step S704). The reservation request may comprise information regarding a time interval for performing the registered radio activity. Next, the arbiter may determine whether to grant the RAT module to use the radio resources for performing the registered radio activity (Step S706). According to an embodiment of the invention, the arbiter may determine whether to grant the RAT module by checking whether there is any registered radio activity registered by other RAT modules which is recorded in the list and has a start time that falls within the time interval for performing the registered radio activity currently requested.

When there is no radio activity registered by another RAT module which has a start time that falls within the time interval for performing the registered radio activity currently requested, or when there is another radio activity registered by another RAT modules which has a start time that falls within the time interval for performing the registered radio activity currently requested but has a lower priority, the arbiter may grant the RAT module to use the radio resources and reserve the radio resources for the RAT module (Step S708).

Otherwise, the arbiter may refuse the RAT module use of the radio resources for performing the registered radio activity currently requested (Step S710). The radio activity is therefore abandoned.

Figure 8:
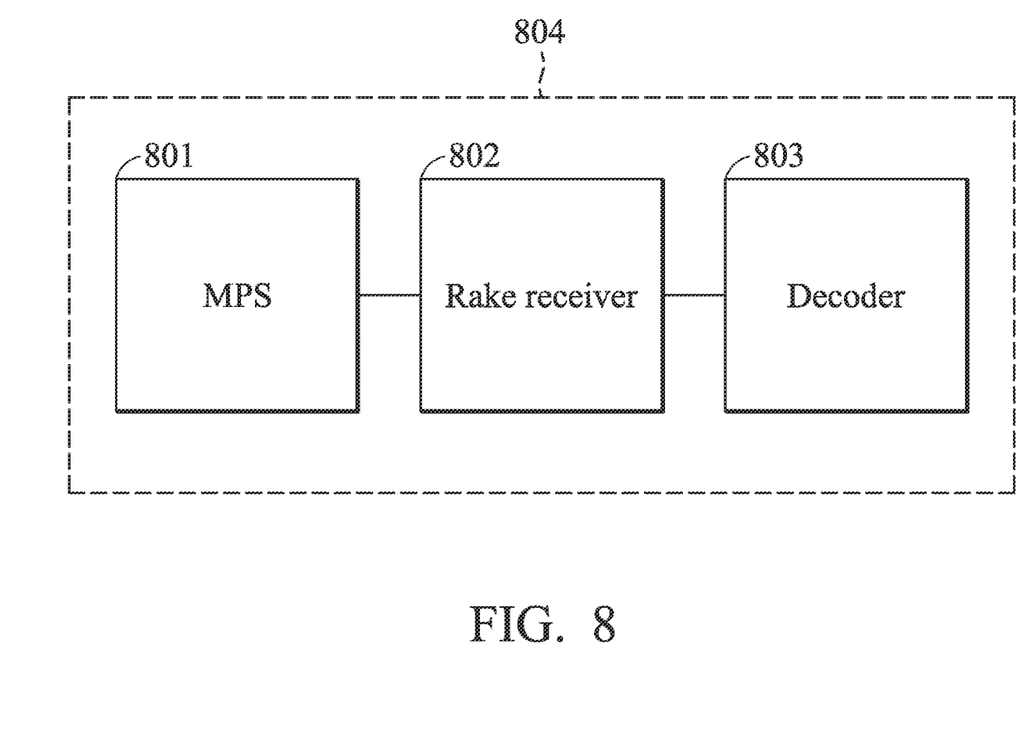
FIG. 8 shows a block diagram of a portion of hardware devices in a baseband processing device according to an embodiment of the invention.

According to an embodiment of the invention, when the RAT module in the packet transfer mode is refused to use the radio resources for data transfer, the data transfer is suspended. However, when the RAT module in the packet transfer mode is a UMTS module, even if the data transfer is suspended, most of the hardware devices in the receiving path of the RAT module are preferably functional due to the communications system's requirement. FIG. 8 shows a block diagram of a portion of hardware devices in a baseband processing device according to an embodiment of the invention. The baseband processing device 804 may at least comprise a multi-path searcher (MPS) 801, a rake receiver 802 and a decoder 803. Note that in order to clarify the concept of the invention, FIG. 8 presents a simplified block diagram, in which only the elements relevant to the invention are shown. However, one with ordinary skill in the art will readily appreciate that the baseband processing device may further comprise other hardware devices and the invention should not be limited what is shown on the FIG. 8.

Figure 9:
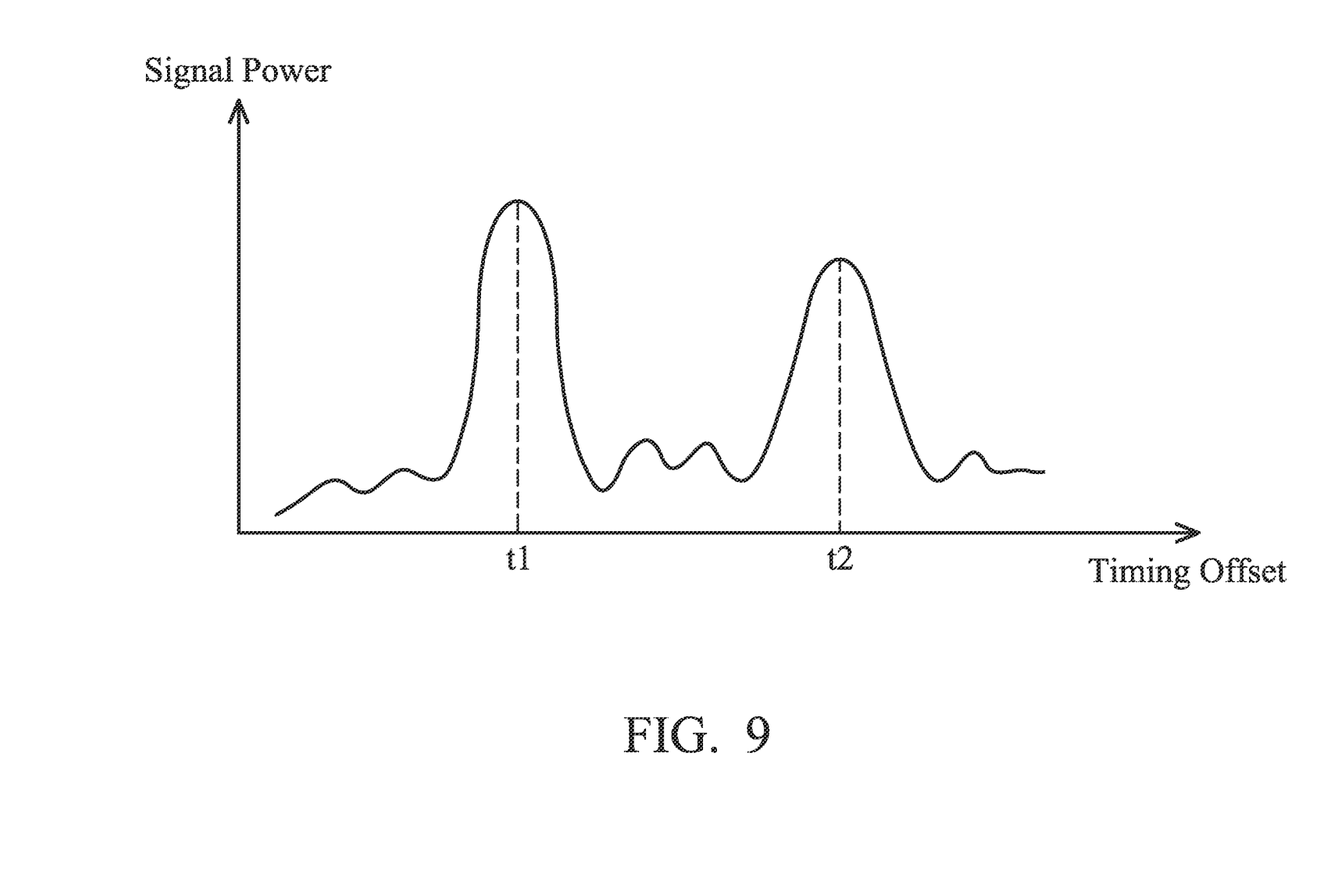
FIG. 9 shows an exemplary waveform of a multi-path signal according to an embodiment of the invention.

The MPS 801 may receive signals (i.e. baseband signals) from the radio transceiver and process the signals to determine a delay profile comprising timing offset(s) of one or more transmission paths for transmitting the signals. According to an embodiment of the invention, the MPS 801 may search for one or more possible transmission paths having strong signal power, and determine the delay profile thereof. The MPS 801 may determine the delay profile by, for example but not limited to, performing correlation on the pilot signals to find out the timing offset of each possible transmission path having the highest correlation result. FIG. 9 shows an exemplary waveform of a multi-path signal according to an embodiment of the invention. In the exemplary waveform shown in FIG. 9, the timing offset t1 and t2 with strong signal power may be obtained by the MPS 801 as the delay profile.

The rake receiver 802 may also receive the signals from the radio transceiver and the delay profile from the MPS 801 and process the signals to retrieve bit data carried in the signals according to the delay profile. The decoder 803 is coupled to the rake receiver 802 and may decode the bit data received from the rake receiver 802 to obtain decoded results. According to an embodiment of the invention, the rake receiver 802 may combine the signals received from the possible transmission paths according to the delay profile to retrieve the bit data carried in the signals. However, if the MPS 801 still tracks garbage signals when the data transfer is suspended, erroneous delay profile will be generated. The erroneous delay profile will cause decoding errors in the rake receiver 802 and the decoder 803, and therefore, seriously degrade receiving performance.

Therefore, according to an embodiment of the invention, before the data transfer is suspended, the processor may store a latest delay profile obtained by the MPS 801 in the memory device, and then disable the MPS 801 and the rake receiver 802 during the gap interval. In addition, because the rake receiver 802 is disabled, the processor may further input the bit data having zero values into the decoder 803 during the gap interval. The zero value bit data does not degrade the overall decoding performance. After the gap interval, the processor may further assign the stored latest delay profile to the rake receiver 802, enable the MPS 801 and the rake receiver 802, and resume the data transfer. By backing up the latest delay profile obtained before the data transfer is suspended, and assigning the back-up delay profile to the rake receiver 802 when the rake receiver 802 is enabled again, an erroneous delay profile will be not generated and propagated in the signal processing of frames, and receiving performance is not degraded.

The above-described embodiments of the present invention can be implemented in any of numerous ways. For example, the embodiments may be implemented using hardware, software or a combination thereof. It should be appreciated that any component or collection of components that perform the functions described above can be generically considered as one or more processors that control the above discussed function. The one or more processors can be implemented in numerous ways, such as with dedicated hardware, or with general purpose hardware that is programmed using microcode or software to perform the functions recited above.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A communications apparatus, comprising:
a processor, coupled to a first radio access technology (RAT) module, a second RAT module and a radio transceiver,
wherein the first RAT module camps on a first cell belonging to a first wireless network and is in an idle mode;
wherein the second RAT module camps on a second cell belonging to a second wireless network and is in a packet transfer mode to construct a connection with the second wireless network and perform data transfer in the second wireless network via the radio transceiver; and
wherein the processor receives a reservation request, requesting permission to use the radio transceiver for performing a first radio activity in the idle mode, from the first RAT module, and determines whether to provide a gap interval during the data transfer of the second RAT module for the first RAT module to use the radio transceiver for performing the first radio activity according to a type of a second radio activity that is going to be preformed by the second RAT module during the data transfer which collides with the first radio activity, and when the gap interval is determined to be provided for the first RAT module, the second RAT module is unable to use the radio transceiver for performing the second radio activity and the data transfer of the second RAT module is suspended during the gap interval.

2. The communications apparatus as claimed in claim 1, wherein radio activities to be preformed by the second RAT module in the packet transfer mode are grouped into two types, comprising a normal data transfer type and a special procedure type, and when the type of the second radio activity belongs to the normal data transfer type, the processor determines to abandon the second radio activity and provide the gap interval for the first RAT module.

3. The communications apparatus as claimed in claim 1, wherein the reservation request carries information regarding a time interval for performing the first radio activity and a length of the gap interval is set according to the time interval.

4. The communications apparatus as claimed in claim 3, wherein the processor further stores information regarding the radio transceiver is reserved by which RAT module during which time interval in a memory device according to the information carried in the reservation request and the determination results.

5. The communications apparatus as claimed in claim 1, wherein before receiving the reservation request, the processor further receives a first registration request for registering the first radio activity from the first RAT module and a second registration request for registering the second radio activity from the second RAT module, the first/second registration request carries information regarding a start time for performing the first/second radio activity and wherein the processor determines whether the second radio activity collides with the first radio activity according to the start time of the second radio activity and a time interval for performing the first radio activity.

6. The communications apparatus as claimed in claim 5, wherein the first RAT module further sets a timer, which will expire before the start time for performing the first radio activity, when transmitting the first registration request, and transmits the reservation request when the timer expires.

7. The communications apparatus as claimed in claim 6, wherein the timer is set to expire one frame ahead of the start time for performing the first radio activity.

8. The communications apparatus as claimed in claim 1, wherein the second RAT module comprises:
a multi-path searcher, receiving signals from the radio transceiver and processing the signals to determine a delay profile comprising timing offset(s) of one or more transmission paths for transmitting the signals; and
a rake receiver, receiving the signals from the radio transceiver and the delay profile from the multi-path searcher and processing the signals to retrieve bit data carried in the signals according to the delay profile,
wherein the processor further stores a latest delay profile obtained by the multi-path searcher before the data transfer is suspended and disables the multi-path searcher and the rake receiver during the gap interval, and after the gap interval, the processor further assigns the stored latest delay profile to the rake receiver, enables the multi-path searcher and the rake receiver, and resumes the data transfer of the second RAT module.

9. The communications apparatus as claimed in claim 8, wherein the second RAT module further comprises:
a decoder, coupled to the rake receiver and decoding the bit data received from the rake receiver,
wherein during the gap interval, the processor further inputs the bit data having zero values into the decoder.

10. A method for scheduling radio activities for at least a first radio access technology (RAT) module and a second RAT module configured in a communications apparatus and sharing a radio transceiver, wherein the first RAT module camps on a first cell belonging to a first wireless network and is in an idle mode and the second RAT module camps on a second cell belonging to a second wireless network and is in a packet transfer mode to construct a connection with the second wireless network and perform data transfer in the second wireless network via the radio transceiver, the method comprises:
maintaining a list comprising a plurality of records of registered radio activities registered by the first and second RAT modules, wherein each record comprises information regarding a start time of a registered radio activity and a RAT module for performing the registered radio activity;
receiving a reservation request for requesting permission to use the radio transceiver for performing a first registered radio activity from one of the first and second RAT modules, wherein the reservation request comprises information regarding a time interval for performing the first registered radio activity;

determining whether to grant the RAT module transmitting the reservation request use of the radio transceiver for performing the first registered radio activity by checking whether there is any registered radio activity registered by another one of the first and second RAT modules which is recorded in the list and has a start time that falls within the time interval for performing the first registered radio activity; and granting the RAT module transmitting the reservation request the use of the radio transceiver for performing the first registered radio activity when there is a second registered radio activity registered by another one of the first and second RAT modules which is recorded in the list and has a start time that falls within the time interval for performing the first registered radio activity and the second registered radio activity has a priority lower than that of the first registered radio activity.

11. The method as claimed in claim 10, further comprising:
granting the RAT module transmitting the reservation request the use of the radio transceiver for performing the first registered radio activity when there is no registered radio activity recorded in the list which has a start time that falls within the time interval for performing the first registered radio activity.

12. The method as claimed in claim 10, wherein radio activities to be preformed by the second RAT module in the packet transfer mode are grouped into two types, comprising a normal data transfer type and a special procedure type, and when the second registered radio activity is registered by the second RAT module and belongs to the normal data transfer type, the priority of the second registered radio activity is lower than that of the first registered radio activity.

13. The method as claimed in claim 10, further comprising:
receiving a registration request for registering a first radio activity from the one of the first and second RAT modules planning to perform the first radio activity, wherein the registration request carries the information regarding the start time for performing the first radio activity; and registering the first radio activity as the first registered radio activity and recording the information regarding the start time for performing the first registered radio activity in the list.

14. The method as claimed in claim 13, further comprising:
setting a timer, which will expire before the start time for performing the first registered radio activity, by the one of the first and second RAT modules when the registration request is transmitted; and transmitting the reservation request by the one of the first and second RAT modules when the timer expires.

15. The method as claimed in claim 13, further comprising:
setting the timer to expire one frame ahead of the start time for performing the first registered radio activity.

16. The method as claimed in claim 10, further comprising:
storing information regarding the radio transceiver is reserved by which RAT module during which time interval in a memory device according to the information carried in the reservation request after determining whether to grant the RAT module transmitting the reservation request.

17. The method as claimed in claim 10, wherein when the RAT module transmitting the reservation request is the first RAT module in the idle mode and is granted the use of the radio transceiver for performing the first registered radio activity when the second RAT module is in the packet transfer mode, the method further comprises:
suspending the data transfer of the second RAT module and refusing the second RAT module to use the radio transceiver during the time interval for performing the first registered radio activity.

18. The method as claimed in claim 17, further comprising:
storing a latest delay profile obtained by a multi-path searcher of the second RAT module before the data transfer is suspended;

disabling the multi-path searcher and a rake receiver of the second RAT module during the time interval for performing the first registered radio activity;

assigning the stored latest delay profile to the rake receiver and enabling the multi-path searcher and the rake receiver after the time interval; and resuming the data transfer of the second RAT module.

* * * * *